(12) United States Patent
Schimke et al.

(10) Patent No.: US 7,606,141 B2
(45) Date of Patent: Oct. 20, 2009

(54) IMPLEMENTING N-WAY FAST FAILOVER IN VIRTUALIZED ETHERNET ADAPTER

(75) Inventors: Timothy Jerry Schimke, Stewartville, MN (US); Lee Anton Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/330,683

(22) Filed: Jan. 12, 2006

(65) Prior Publication Data

US 2007/0159960 A1 Jul. 12, 2007

(51) Int. Cl.
*H04L 12/56* (2006.01)
(52) U.S. Cl. ...................................... 370/216
(58) Field of Classification Search .................. 370/216
See application file for complete search history.

(56) References Cited

U.S. PATENT DOCUMENTS

2007/0198668 A1 * 8/2007 Meiri et al. .................. 709/220
2008/0301692 A1 * 12/2008 Billau et al. ................ 718/104

* cited by examiner

*Primary Examiner*—Derrick W Ferris
*Assistant Examiner*—Christopher R Crompton
(74) *Attorney, Agent, or Firm*—Joan Pennington

(57) ABSTRACT

A method, apparatus and computer program product are provided for implementing N-way fast failover in a virtualized Ethernet adapter. Requests are posted to queue pairs (QPs) to send and receive Ethernet packets. Each QP stores a designated physical Ethernet port. At the time of a failover, the stored failed designated physical Ethernet port in a QP is changed to a new functional physical Ethernet port. An increased bandwidth is available prior to failover because all ports are used, eliminating the use of any backup, idle ports of prior fast failover arrangements.

18 Claims, 4 Drawing Sheets

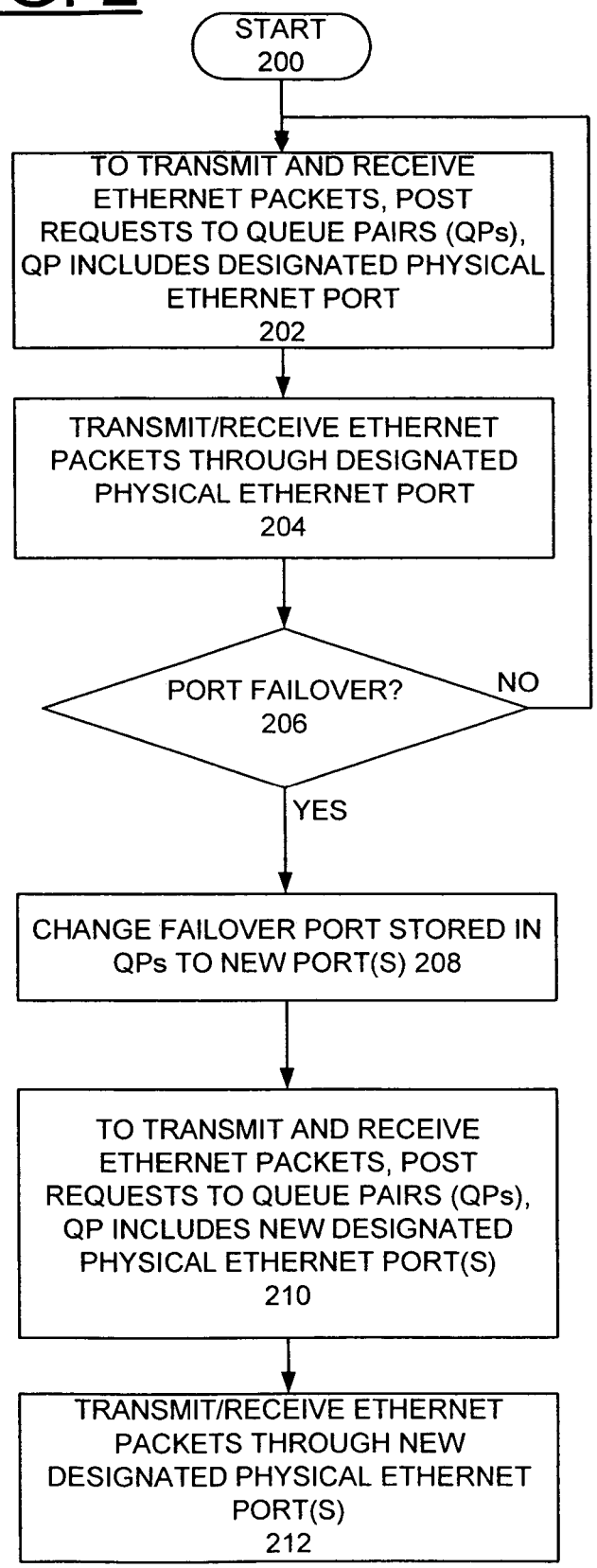

IMPLEMENTING N-WAY FAST FAILOVER IN VIRTUALIZED ETHERNET ADAPTER

FIELD OF THE INVENTION

The present invention relates generally to the data processing field, and more particularly, relates to a method, apparatus and computer program product for implementing N-way fast failover in a virtualized Ethernet adapter.

DESCRIPTION OF THE RELATED ART

One known, prior art arrangement provides rapid failover between ports of a single Ethernet adapter. Rapid failover is accomplished by switching the data buffers and other associated structures above the transceivers from one port to another when a port has failed. A significant drawback to this prior art arrangement is that an additional idle physical Ethernet port is required to accomplish the failover.

This prior art arrangement worked with a pair of ports including one backup port normally being idle. Implementations with more than two ports would be possible, but would disadvantageously include additional idle backup ports. This prior art arrangement has been somewhat acceptable in past technologies.

However, the cost of a single port has significantly increased with 10 Gigabit (Gb) Ethernet as compared with Gigabit Ethernet. This increased cost makes the prior art arrangement much less attractive with the newer ports having significantly increased cost for the required idle backup port.

Link Aggregation defined in the IEEE 802.3ad (Link Aggregation) standard requires a protocol running between the ports, and special enabling firmware is required between a switch and a workstation. Also there is a special function required out of the switch for the IEEE 802.3ad (Link Aggregation).

A need exists for an effective mechanism for implementing N-way fast failover in a virtualized Ethernet adapter. It is desirable to provide such mechanism having faster failover speeds as compared to 802.3ad while providing much of the same function.

SUMMARY OF THE INVENTION

Principal aspects of the present invention are to provide a method, apparatus and computer program product for implementing N-way fast failover in a virtualized Ethernet adapter. Other important aspects of the present invention are to provide such method, apparatus and computer program product for implementing N-way fast failover in a virtualized Ethernet adapter substantially without negative effect and that overcome many of the disadvantages of prior art arrangements.

In brief, a method, apparatus and computer program product are provided for implementing N-way fast failover in a virtualized Ethernet adapter. Requests are posted to queue pairs (OPs) to send and receive Ethernet packets. Each OP stores a designated physical Ethernet port and a respective Media Access (MAC) address. At the time of a failover, the stored failed designated physical Ethernet port in a QP is changed to a functional physical Ethernet port and the stored respective MAC address is retained.

In accordance with features of the invention, an increased bandwidth is available prior to failover because all ports are used, eliminating the use of any backup, idle ports. Improved latency is provided prior to failover because all ports are used. Fast failover is managed in a hypervisor and the failover is completely transparent to the device driver and host system, eliminating the required unique device driver to accommodate fast failover of prior art arrangements and this device driver was required for each operating system platform.

In accordance with features of the invention, with more than two physical Ethernet ports, at the time of a failover, the stored failed designated physical Ethernet port in the QPs are changed, for example, to redistribute the QPs evenly among the multiple new available physical Ethernet ports.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a logic flow chart illustrating exemplary steps for implementing N-way fast failover in a virtualized Ethernet adapter in accordance with the preferred embodiment.

DETAILED DESCRIPTION OF THE PREFERRED EMBODIMENTS

In accordance with features of the invention, an improved method is provided for failover of an Ethernet port. A Host Ethernet Adapter (HEA) accomplishes virtualization through the utilization of InfiniBand constructs as the interface to the host operating system in each logical partition. To send and receive Ethernet packets, requests are posted to queue pairs (QPs). These QPs work like standard InfiniBand QPs with the exception that the packet generated is an Ethernet packet, which is sent and received through a physical Ethernet port instead of an InfiniBand packet sent and received through a physical InfiniBand port.

Figure 1A:
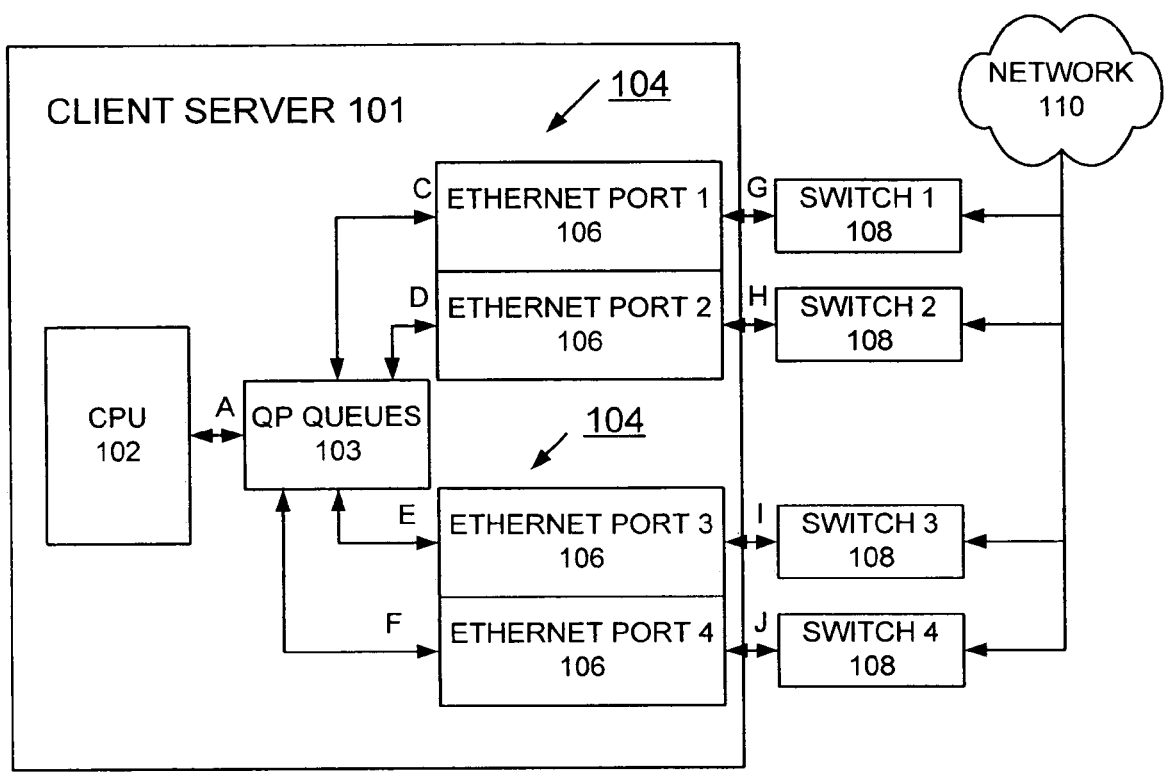
FIG. 1 is a block diagram representation illustrating an exemplary network system for implementing N-way fast failover in a virtualized Ethernet adapter in accordance with the preferred embodiment.
Figure 1B:
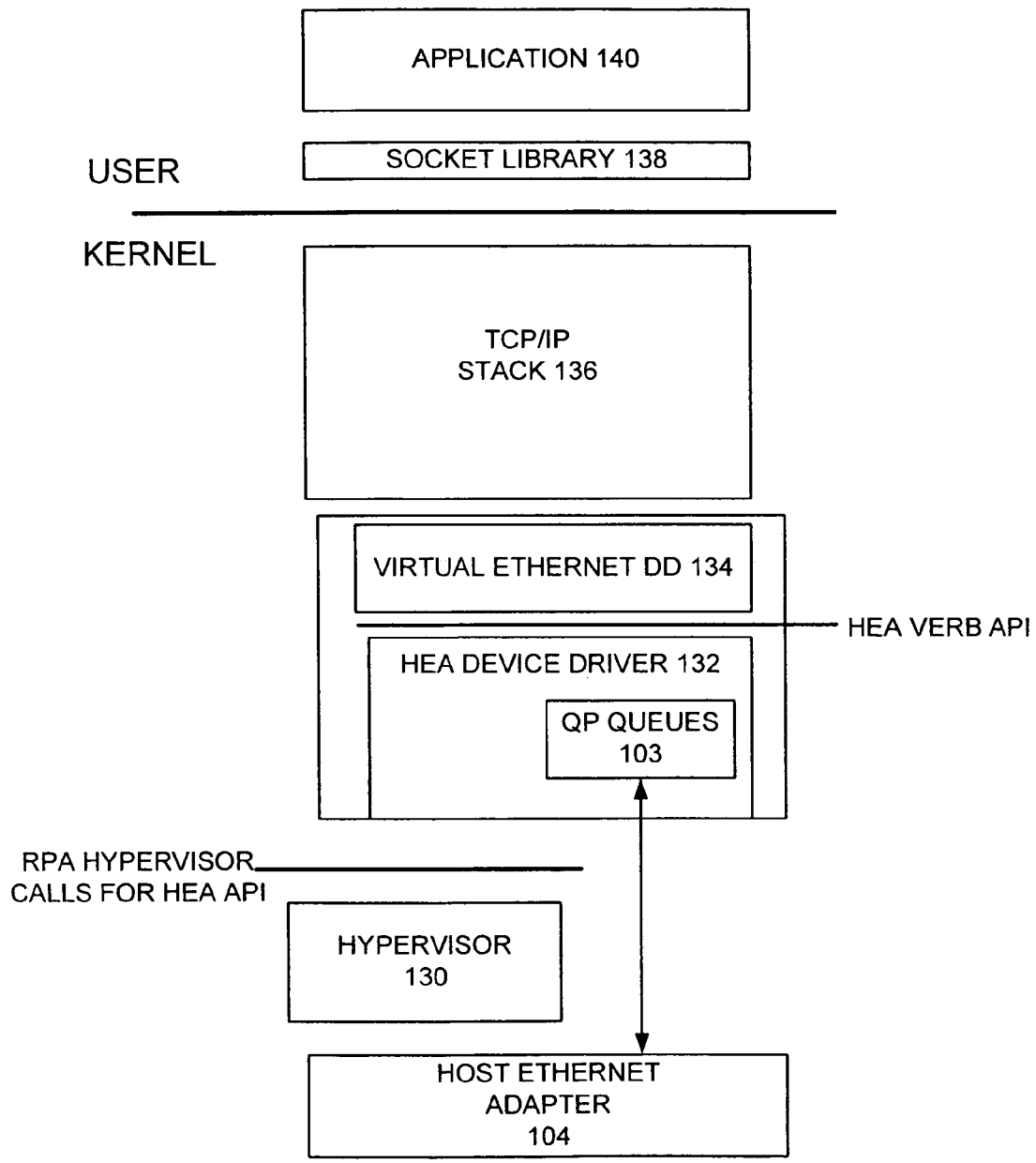

Having reference now to the drawings, in FIGS. 1A and 1B, there is shown an exemplary network system for implementing N-way fast failover in a virtualized Ethernet adapter generally designated by the reference character 100 in accordance with the preferred embodiment.

Network system 100 includes a server computer 101 including a central processing unit 102. Server computer 101 couples a plurality of queue pairs (QPs) queues 103 to a pair of Host Ethernet Adapter (HEA) 104, as shown in FIG. 1A. Each HEA 104 includes a respective pair of Ethernet ports 1, 2 and 3, 4, 106. As shown, each Ethernet port 106 is coupled by a respective one of a plurality of switches 1-4, 108 to a network 110. All of Ethernet ports 1, 2 and 3, 4, 106 of the preferred embodiment can be used concurrently.

To the external network 110 each HEA 104 appears like a set of Ethernet adapters connected to an Ethernet switch 108. HEA 104 supports virtualization of the physical Ethernet adapter to provide separate logical Ethernet adapters. This allows Ethernet support to be provided for many partitions with a single card instead of requiring a physical Ethernet adapter for each partition. For example, the base hardware support of each HEA 104 includes two physical ports 106. Fast failover is accomplished by switching between the physical ports 106 based upon a designated physical Ethernet port 106 included in respective QPs 103. QPs 103 store a respective Media Access (MAC) address, and the stored MAC address is retained when the QP is changed to a different physical port.

In FIG. 1B, there is shown an exemplary software layer diagram of server computer 101. As illustrated, the software configuration has at its lowest level a system resources manager or hypervisor 130 that allocates resources among one or more operating systems. Other software levels of server computer 101 include a Host Ethernet Adapter (HEA) device driver (DD) 132, a virtual Ethernet DD 134, and a Transport Control Protocol/Internet Protocol (TCP/IP) stack 136 at a kernel level, a socket library 138 and application 140 at a user level. The QP Queues 103 are located and maintained in the HEA device driver 132 with a work request data-path to each HEA 104, each HEA 104 including two physical ports 106 as shown in FIG. 1A.

In accordance with features and advantages of the invention, with a two port Host Ethernet Adapter 104 both ports 106 are actively utilized for data traffic, instead of using only a single port as in prior art fast failover arrangements. It accomplishes this by segregating the logical adapters into two sets, and assigning each set to a different port. If a port fails, the logical adapters tied to those ports are moved automatically to the other port. This is accomplished completely in the hypervisor 130 without requiring any changes of the device driver 132, 134.

In accordance with features and advantages of the invention, an increased bandwidth is available prior to failover because all physical Ethernet ports 106 are used, eliminating the use of any backup, idle ports. Improved latency is provided prior to failover because all ports 106 are used. Latency will improve even if the link is not saturated due to queueing factors. Performance after failover is exactly equivalent to prior solutions. No changes are required in device driver 132, 134 or any of the host operating systems. The failover is completely transparent to the device driver and host system. Prior art fast failover solutions required a unique device driver to accommodate fast failover, and this device driver was required for each operating system platform. Fast failover now is managed completely in the hypervisor 130. This includes network interactions, for example, sending an Address Resolution Protocol (ARP) packet to update routing information.

Host Ethernet Adapter 104 accomplishes virtualization through the utilization of InfiniBand constructs as the interface to the host operating system in each logical partition. To send and receive Ethernet packets, requests are posted to queue pairs (QPs) queues 103. These QPs queues 103 function like standard InfiniBand QPs except that the packet generated is an Ethernet packet, which is sent/received through a physical Ethernet port 106. To the external network the HEA 104 appears like a set of Ethernet adapters connected to an Ethernet switch 108.

Fast failover of the preferred embodiment is implemented with a new method that enables the usage of both ports 106 simultaneously prior to the failure. This method of the preferred embodiment enables network system 100 to apply twice the bandwidth prior to a port failure, while maintaining the same bandwidth as the prior art failover arrangements after failure. This is accomplished with a different mechanism used for switching between ports. The QP queues 103 act as a queue for each individual logical Ethernet adapter and hold pending send and receive requests. To send packets out of the physical port 106, the hardware goes round-robin through the QPs queues 103 and builds packets into the transmit buffer to be sent out of the physical port 106. A similar process is handled for receive, where incoming packets to a given port 106 go into a transmit buffer and then are distributed to recipient QPs. Each of the QP queues 103 includes an indication of which port 106 it is currently assigned to and also contains the MAC address for the logical adapter it is handling. Prior to failover both ports, for example, Ethernet ports 1, 2, 106, and Ethernet ports 3, 4, 106 are used concurrently with half of the logical adapters (and corresponding QPs) assigned to each. This configuration was not possible prior to Ethernet virtualization because then there was only a single MAC address, and a given MAC address could not be used concurrently on two ports.

At the time of a failover, for example, with an implementation including two ports 1-2, 106 the mechanism for switching ports changes the failed physical port 106, for example, Ethernet port 1 stored in the QPs 103 to the other port, Ethernet port 2, and on the next round-robin cycle packets begin to immediately be transmitted out of the other Ethernet port 2. When the number of ports 1-N is greater than two, the QPs from the failing port, for example, Ethernet port 1, are redistributed evenly among all of the remaining ports 2-N, such that no one physical port becomes overloaded with traffic.

Failover is nearly instantaneous because it is handled in hardware based upon the status of the physical port, and avoids any latency induced by software recovery. For the two port case, this is accommodated via having the hardware handling traffic for a given Ethernet port 1 or 2, 106 use a given QP if either a) that QP is designated as belonging to that port, or b) if that QP belongs to the other port and the other port is currently failed. This solution is readily extended to handle the N-port case by explicitly storing the failover port in the QP. Now the port hardware will use a given QP if either a) that QP is designated as belonging to that port, or b) if that QP belongs to a port that is currently failed, and this port is the failover port stored in the QP. After a port has failed in the N-port case, firmware will rearm the failover logic by changing all QPs originally assigned to failed port to be explicitly attached to their respective new ports, which need not all be the same port, and changing the failover port in each of those QPs to be a currently functional port and as before, the QPs 103 may be spread across many ports 106.

If the transition cannot be handled in hardware, then the alternative is to handle the transition in firmware. Firmware is interrupted at the point of port failure and then explicitly changes the assigned port in the QPs 103. This has the drawback that additional packets might be lost because of the increased delay prior to the failover being accomplished. This drawback is minimized because the packets which are lost are destined for a large number of logical adapters, so the loss for any single logical adapter is small. This allows the invention to be realized even in the absence of explicit hardware support.

In accordance with features of the invention, the method scales up to implementations with any number of ports, and behavior is improved as more ports are added. By increasing the number of ports the available resources are correspondingly increased and result in more available bandwidth and greater fault tolerance. Additionally, the logical ports advantageously are rebalanced across all of the still functioning physical ports to maintain good performance.

For example, compare a four port adapter utilizing the method of the invention with a pair of two port adapters utilizing the prior solution. In the absence of failure, the method of the invention uses four physical ports while the prior art arrangement uses two ports. In the event of a single port connection failure, the method of the invention will then be actively using three physical ports while the prior solution will still be using two ports.

In the event of a double port connection failure, the method of the invention then utilizes two ports and maintains network access for all resources. The prior solution will be using two ports if the failures were distributed evenly across the adapters. If both ports which lost the connection were on the same adapter, then only a single port will be utilized by the prior solution and the network connection will have been lost for those resources tied to the failing adapter.

In the event of a triple failure, the method of the invention then utilizes a single port 106 and maintains network access for all resources. The prior solution will also be utilizing a single port, but network access are lost for half of the resources. In the event all four ports experience a connection failure, then both solutions lose network access for all resources.

Referring now to FIG. 2, there are shown exemplary steps for implementing N-way fast failover in a virtualized Ethernet adapter in accordance with the preferred embodiment starting at a block 200. First to transmit and receive Ethernet packets, requests are posted to queue pairs (QPs), each QP includes a designated physical Ethernet port, as indicated in a block 202. The Ethernet packets are transmitted and received through a respective designated physical Ethernet port as indicated in a block 204. When a port failover is identified as indicated in a decision block 206, the failover port stored in the QPs is changed to a new port or multiple new ports as indicated in a block 208. Then to transmit and receive Ethernet packets, requests are posted to queue pairs (QPs), each QP includes a new designated physical Ethernet port, as indicated in a block 210. The Ethernet packets are transmitted and received through a respective new designated physical Ethernet port as indicated in a block 212.

Figure 3:
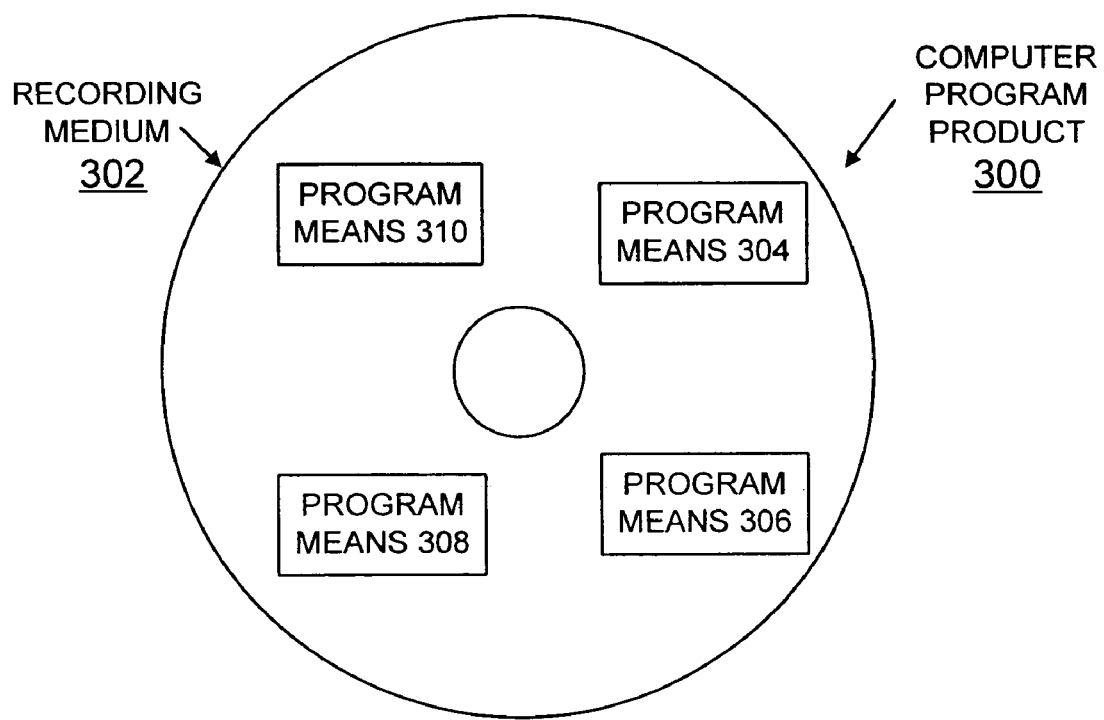
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, or a similar computer program product. Recording medium 302 stores program means 304, 306, 308, 310 on the medium 302 for carrying out the methods for implementing N-way fast failover in a virtualized Ethernet adapter of the preferred embodiment in, the system 100 of FIGS. 1A and 1B.

A sequence of program instructions or a logical assembly of one or more interrelated modules defined by the recorded program means 304, 306, 308, 310, direct the computer system 100 for implementing N-way fast failover in a virtualized Ethernet adapter of the preferred embodiment.

While the present invention has been described with reference to the details of the embodiments of the invention shown in the drawing, these details are not intended to limit the scope of the invention as claimed in the appended claims.

What is claimed is:

1. A method for implementing N-way fast failover in a virtualized Ethernet adapter comprising the steps of:
   providing at least one Host Ethernet Adapter (HEA),
   providing at least a pair of physical Ethernet ports with each said HEA; each of said physical Ethernet ports being coupled by a respective switch to a network;
   providing each said HEA supporting virtualization with InfiniBand constructs with each said HEA including separate Logical Ethernet adapters; said logical Ethernet adapters being segregated into two sets, each said set being assigned to a different port;
   coupling a plurality of queue pairs (QPs) to said at least one Host Ethernet Adapter (HEA);
   posting requests to the queue pairs (QPs) to send and receive Ethernet packets with each QP storing a designated physical Ethernet port, each QP functioning as a queue for each separate Logical Ethernet adapter, and the queue pairs (QPs) function as standard InfiniBand queue pairs except for, generating Ethernet packets;
   responsive to a failover, changing a stored failed designated physical Ethernet port in a QP to a stored new functional physical Ethernet port;
   switching to a functional physical Ethernet port based upon the stored new functional physical Ethernet port in the QP; and
   transmitting and receiving Ethernet packets through the functional physical Ethernet ports.

2. A method for implementing N-way fast failover in a virtualized Ethernet adapter as recited in claim 1 includes using each available physical Ethernet port for transmitting and receiving Ethernet packets prior to said failover, eliminating the use of any backup, idle physical Ethernet ports.

3. A method for implementing N-way fast failover in a virtualized Ethernet adapter as recited in claim 1 wherein the virtualized Ethernet adapter includes more than two physical Ethernet ports, and includes changing said stored failed designated physical Ethernet port in the QPs to redistribute the QPs among the multiple functional physical Ethernet ports.

4. A method for implementing N-way fast failover in a virtualized Ethernet adapter as recited in claim 1 includes providing a hypervisor for managing said failover, wherein said failover is completely transparent to a device driver and host system.

5. A method for implementing N-way fast failover in a virtualized Ethernet adapter as recited in claim 1 includes transmitting and receiving Ethernet packets through a respective designated physical Ethernet port based upon the stored physical Ethernet in the QPs.

6. A method for implementing N-way fast failover in a virtualized Ethernet adapter as recited in claim 1 includes transmitting and receiving Ethernet packets through a respective new designated physical Ethernet port responsive to said failover.

7. A computer program product tangibly embodied in a machine readable medium for implementing N-way fast failover in a virtualized Ethernet adapter in a server computer, said sewer computer including at least one Host Ethernet Adapter (HEA), each said HEA including at least a pair of physical Ethernet ports; each of said physical Ethernet ports being coupled by a respective switch to a network; each said HEA supporting virtualization with InfiniBand constructs with each said HEA including separate Logical Ethernet adapters; said logical Ethernet adapters being segregated into two sets, each said set being assigned to a different port; and a plurality of queue pairs (QPs) coupled to said at least one Host Ethernet Adapter (HEA); said computer program product including instructions embodied in the machine readable medium and executed by a hypervisor to cause the hypervisor to perform the steps comprising:
   posting requests to the queue pairs (QPs) to send and receive Ethernet packets with each QP storing a designated physical Ethernet port, each QP functioning as a queue for each separate Logical Ethernet adapter, and the queue pairs (QPs) function as standard InfiniBand queue pairs except for generating Ethernet packets;
   responsive to a failover, changing a stored failed designated physical Ethernet port in a QP to a stored new functional physical Ethernet port;

switching to a functional physical Ethernet port based upon the stored new functional physical Ethernet port in the QP; and transmitting and receiving Ethernet packets through the functional physical Ethernet ports.

8. A computer program product for implementing N-way Fast failover in a virtualized Ethernet adapter as recited in claim 7 further includes transmitting and receiving Ethernet packets through a respective designated physical Ethernet port based upon the stored physical Ethernet port in the QPs.

9. A computer program product for implementing N-way fast failover in a virtualized Ethernet adapter as recited in claim 7 includes transmitting and receiving Ethernet packets through a respective new designated physical Ethernet port responsive to said failover.

10. A computer program product for implementing N-way fast failover in a virtualized Ethernet adapter as recited in claim 7 includes using each available physical Ethernet port for transmitting and receiving Ethernet packets prior to said failover, eliminating the use of any backup, idle physical Ethernet ports.

11. A computer program product for implementing N-way fast failover in a virtualized Ethernet adapter as recited in claim 7 wherein the virtualized Ethernet adapter includes more than two physical Ethernet ports, and further includes changing said stored failed designated physical Ethernet port in the QPs to redistribute the QPs among the multiple functional physical Ethernet ports.

12. A computer program product for implementing N-way fast failover in a virtualized Ethernet adapter as recited in claim 7 includes providing a hypervisor for managing said failover, wherein said failover is completely transparent to a device driver and host system.

13. Apparatus for implementing N-way fast failover in a virtualized Ethernet adapter in a server computer comprising: at least one Host Ethernet Adapter (HEA), at least a pair of physical Ethernet ports included with each said HEA; a respective switch coupling each of said physical Ethernet ports to a network;

each said HEA supporting virtualization with InfiniBand constructs with each said HEA including separate logical Ethernet adapters; said logical Ethernet adapters being segregated into two sets, each said set being assigned to a different port;

a plurality of queue pairs (QPs) coupled to said at least one Host Ethernet Adapter (HEA); said plurality of queue pairs (QPs) for posting requests to send and receive Ethernet packets, each of said QPs storing a designated physical Ethernet port, each QP functioning as a queue for each separate logical Ethernet adapter, and said queue pairs (QPs) function as standard InfiniBand queue pairs except for generating Ethernet packets;

said Ethernet packets being transmitted and received through the functional physical Ethernet ports; and a hypervisor implementing failover, changing a stored failed designated physical Ethernet port in said QPs to a new functional physical Ethernet port, responsive to a failover.

14. Apparatus for implementing N-way fast failover in a virtualized Ethernet adapter as recited in claim 13 wherein each available physical Ethernet port of the virtualized Ethernet adapter is used for transmitting and receiving Ethernet packets prior to said failover, eliminating the use of any backup, idle physical Ethernet ports.

15. Apparatus for implementing N-way fast failover in a virtualized Ethernet adapter as recited in claim 13 wherein said hypervisor manages said failover.

16. Apparatus for implementing N-way fast failover in a virtualized Ethernet adapter as recited in claim 15 wherein said hypervisor is completely transparent to a device driver and host system.

17. Apparatus for implementing N-way fast failover in a virtualized Ethernet adapter as recited in claim 13 wherein the virtualized Ethernet adapter includes more than two physical Ethernet ports, and said hypervisor changes said stored failed designated physical Ethernet port in the QPs to multiple functional physical Ethernet ports responsive to said failover.

18. Apparatus for implementing N-way fast failover in a virtualized Ethernet adapter as recited in claim 17 wherein said stored failed designated physical Ethernet port in the QPs are substantially equally redistributed among the multiple functional physical Ethernet ports responsive to said failover.

* * * * *

UNITED STATES PATENT AND TRADEMARK OFFICE
CERTIFICATE OF CORRECTION

PATENT NO.      : 7,606,141 B2
APPLICATION NO. : 11/330683
DATED           : October 20, 2009
INVENTOR(S)     : Schimke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this

Fifth Day of October, 2010

David J. Kappos
*Director of the United States Patent and Trademark Office*